Nov. 25, 1969   N. J. WILKAITIS ET AL   3,479,983
TEMPERATURE SENSOR
Filed Oct. 24, 1967
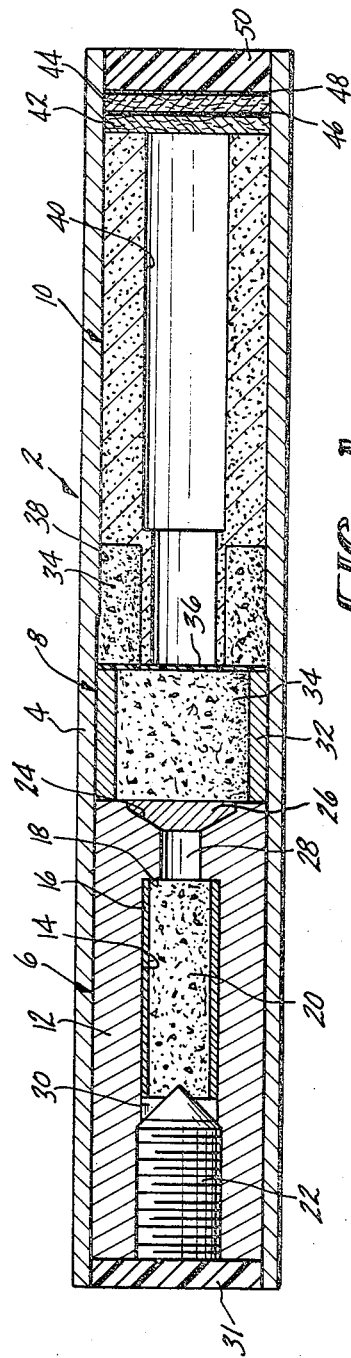
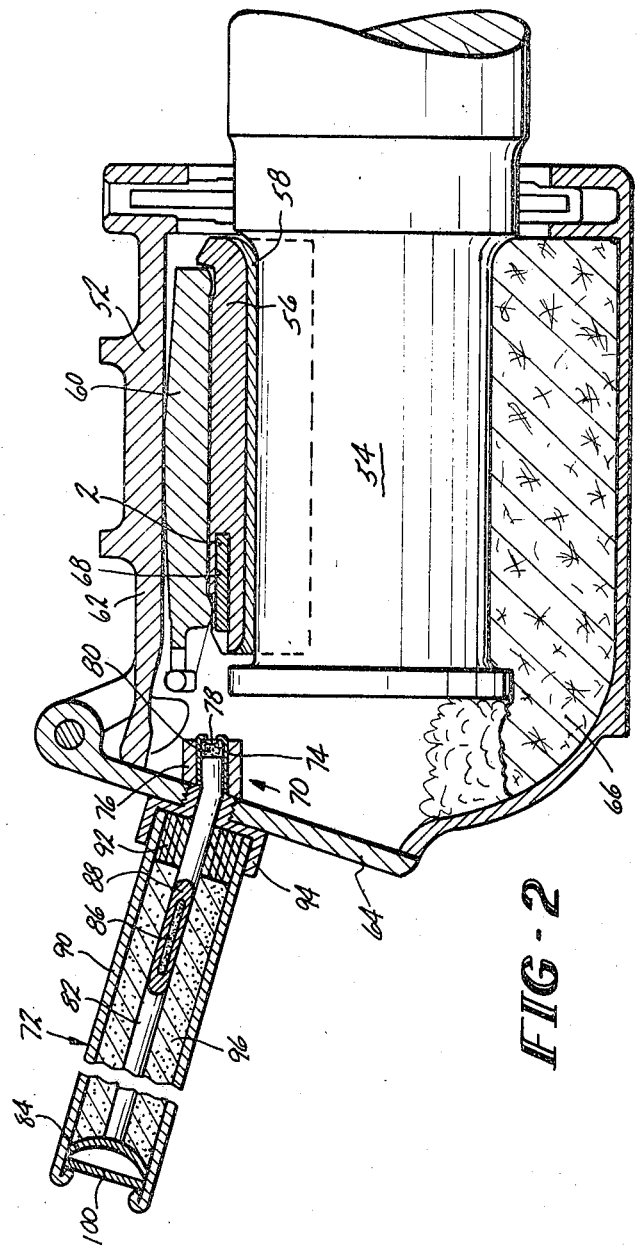
INVENTORS.
NORMAN J. WILKAITIS
ADRIAN G. LA BROT
BY  H. Samuel Kieser
ATTORNEY 3,479,983
TEMPERATURE SENSOR
Norman J. Wilkaitis, Marion, and Adrian G. La Brot, Alton, Ill., assignors to Olin Mathieson Chemical Corporation
Filed Oct. 24, 1967, Ser. No. 677,610
Int. Cl. G01k 1/02
U.S. Cl. 116—114.5                                14 Claims

ABSTRACT OF THE DISCLOSURE

A temperature sensor including a housing in which is sealed a pyrophoric material in a non-air environment. Energy generating means is positioned adjacent the pyrophoric material and is separated therefrom by a fusible metal seal capable of melting at a predetermined temperature. The energy generating means is adapted to be actuated upon the melting of the fusible metal seal and the spontaneous ignition of the pyrophoric material when exposed to air.

---

This invention relates generally to a temperature sensor. More particularly, it relates to a temperature sensor operable at a predetermined temperature to actuate an acceptor which may be spaced a distance therefrom. The acceptor in turn actuates a suitable alarm.

In some instances a first element which must be guarded against a rise in temperature above a predetermined point is spaced from another element to which the acceptor and alarm system must be attached. Although it would be possible to utilize a mechanical linkage between the first element and acceptor, in some instances this may not be feasible due to the fact that there may be relative movement between the first element and acceptor which might, over a long period of time, result in a failure of the mechanical linkage.

One particular instance wherein such a problem arises is in the case of journal bearing structures of a railway car or the like. Such structures usually include a journal box surrounding the axle, an axle journal, a journal bearing provided with a lining with a suitable bearing material such as bronze or babbit material which seats on the journal, and a bearing wedge between the bearing and the top of the journal box. The journal box is normally closed by a hinged lid.

One of the most serious problems faced in the operation of railroads is the occurrence of an overheated condition reached in the axle bearing structure such as when a "hot box" occurs due to lack of proper lubrication. Under this condition frictional metal-to-metal contact develops between the axle journal and the bearing resulting in high temperatures. After a short perior under this condition, the bearing disintegrates and the bearing wedge drops onto the journal. The destruction of the metal continues and the journal "burns off" and one wheel of a pair on the axle is freed. Consequences from this point on can be disatrous, including the cutting of railroad ties, the spreading of rails, and derailment, resulting in damage to the road, freight cars, their contents, tie-up of the line, and loss of life.

In order to properly sense the temperature so that neither a premature signal is given nor a signal given too late, after the breakdown of the bearing, it is desirable that the temperature sensor be mounted within the journal bearing itself. However, to properly give a signal, the temperature sensor must in some way be connected to a device on the journal housing which is capable of providing a signal to an outside source. One of the most ideal places for mounting an acceptor which can actuate a signal is on the journal housing lid itself. Thus, it is necessary that the temperature sensor when actuated breach a gap between the journal bearing and the housing lid. It has been found that the journal bearing tends to move in relation to the journal housing during movement of the train. Such movement over an extended period of time would tend to result in a failure of any direct linkage between the sensor and the acceptor.

It is, therefore, an object of this invention to provide an improved temperature sensor.

It is a further object of this invention to provide an improved temperature sensor which is actuated at a predetermined temperature.

Yet another object of this invention is to provide a temperature sensor which is actuated at a predetermined temperature to initiate an energy source.

It is still another object of the present invention to provide a temperature sensor which emits an energy source which can actuate an acceptor spaced across a gap from the sensor itself.

These and other objects of the invention may be accomplished through the provision of a temperature sensor comprising a housing in which is sealed a pyrophoric material in a non-air environment. Energy generating means is positioned adjacent the pyrophoric material separated therefrom by a fusible metal seal capable of melting at a predetermined temperature. The energy generating means is adapted to be actuated upon the melting of the fusible metal seal and the spontaneous ignition of the pyrophoric material when exposed to air.

The energy generating means may be in the form of a booster pellet mounted in the discharge end of the housing with a suitable ignitor mix positioned between the pellet and the fusible metal seal so that upon exposure of the pyrophoric material to air after the melting of the fusible seal, the spontaneous combustion of the pyrophoric material will ignite the ignitor mix which will in turn ignite the booster pellet which will emit a flame from the housing which can transverse the gap between the sensor and any suitable acceptor.

The invention may be more readily understood by reference to the following description of a preferred embodiment and to the accompanying drawings in which:

FIGURE 1 is a longitudinal sectional view of a sensor constructed in accordance with the principles of the present invention; and FIGURE 2 is a longitudinal sectional view of the axle bearing structure of the type commonly used on a railway car showing the use of the temperature sensor of FIGURE 1.

Referring to the drawing and particularly to FIGURE 1, the temperature sensor 2 comprises a tubular housing 4 which houses a detector assembly 6, an ignitor mix assembly 8 and a flame-producing booster pellet 10. The housing 4 may be fabricated from any material which is a good heat conductor. In accordance with the preferred embodiment of the present invention, sleeve 4 comprises an aluminum tube.

The detector assembly 6 is mounted at the rearward end of the housing 4 and comprises a brass housing 12 having a longitudinally extending bore 14 therethrough. A tubular sleeve 16, also fabricated from brass, is mounted within the housing 12 and positioned against a rearwardly facing shoulder 18 in the bore 14. The brass sleeve 16 contains a suitable pyrophoric material 20 which spontaneously ignites in the presence of air. Because of the relative safety of handling, phosphorus is preferred as the pyrophoric material although other materials may be used. The rearward end of the brass housing 12 is sealed by means of a set-screw 22 threadedly received therein. The forward end of the brass housing 12 is provided with a frustoconical opening 24 which is closed by a fuse metal seal 26 which is formed of a particular composition designed to melt at a predetermined temperature. The interior of the brass housing 12 contains an open space 28 between the end of the brass sleeve 16 and the fuse metal seal 26, as well as an open space 30 between the rearward surface of the sleeve 16 and the set-screw 22 to permit expansion of the pyrophoric material if it melts or vaporizes at a temperature lower than the desired melting point of the fuse metal seal 26. An epoxy resin 31 seals the detector unit 6 within the aluminum sleeve 4.

The fuse metal seal 26 may be formed from any one of a plurality of different alloys depending upon the desired melting point. However, such alloys must be those combinations which form eutectics since the fusing action must be abrupt to provide a narrow range of activation temperatures. Non-eutectic fusible alloys tend to become liquid over a wide range of temperatures and are not considered suitable for this purpose. The following table lists the various examples of such eutectic alloys and their melting points although it is understood that other eutectic fusible alloys are available.

TABLE I.—FUSIBLE ALLOYS—EUTECTICS

| | Bismuth (Percent) | Lead (Percent) | Tin (Percent) | Cadmium (Percent) | Indium (Percent) | Melting temp. (°F.) |
|---|---|---|---|---|---|---|
| 1 | 44.70 | 22.60 | 8.30 | 5.30 | 19.10 | 117 |
| 2 | 49.00 | 18.00 | 12.00 | | 21.00 | 136 |
| 3 | 50.00 | 26.70 | 13.30 | 10.00 | | 158 |
| 4 | 57.00 | | 17.00 | | 26.00 | 174 |
| 5 | 51.60 | 40.20 | | 8.20 | | 197 |
| 6 | 52.50 | 32.00 | 15.50 | | | 203 |
| 7 | 55.50 | 44.50 | | | | 255 |
| 8 | 57.42 | 1.00 | 41.58 | | | 275 |
| 9 | 58.00 | | | 42.00 | | 281 |
| 10 | 60.00 | | | | 40.00 | 291 |
| 11 | 100.00 | | | | | 520 |

The ignitor mix assembly 8 is positioned in the housing 4 immediately forward of the detector assembly 6. The ignitor assembly 8 includes an aluminum sleeve 32 containing a suitable ignitor mix 34. The front end of the aluminum sleeve is closed by a suitable closure 36 which should be characterized by having relatively high strength and the capability of rapid disintegration when the ignitor mix is ignited. For this purpose it has been found that a thin film of polyethylene terphthalate, sold under the trademark Mylar, by E. I. du Pont de Nemours & Co., Inc., is extremely satisfactory for this purpose.

The ignitor mix 34 must be characterized by its ability to be rapidly ignited by the combustion of phosphorous in air and also its ability to provide enough heat to ignite the booster pallet 10. While it is obvious that many different formulations may be suitable for this purpose, the preferred compound consists of a mixture of equal quantities of silicon, lead dioxide and cuprous oxide. With this particular type of ignitor mix the lead dioxide and cuprous oxide act as an oxidizer while the silicon is the fuel.

The booster pellet 10 is positioned at the discharge end of the aluminum sleeve 32 with its rearward end immediately adjacent the closure 36. To insure actuation of the booster pellet 10, a quantity of the ignitor mix 34 is placed in six circumferentially spaced holes 38 in the ignitor end of the booster pellet 10. The booster pellet 10 is generally cylindrical, having a cylindrical bore 40 passing there through. The formulation of the booster pellet must be such that it is readily ignitable by the ignitor material 34 and is capable of emitting a flame from the discharge end of the sensor 2. According to the preferred embodiment, the booster pellet 10 comprises from about 20 to about 30% magnesium, from about 60 to about 70% barium nitrate and from about 8 to about 12% binder. The binder comprises from about 88 to about 92% of a lower molecular weight resin formed from the condensation product of epichlorohydrin and bisphenol-A, sold under the trademark Epon, by Shell Chemical Co., and from about 8% to about 12% of a polyamide More specifically the exact formulation of one such booster pellet consisted of 25% magnesium, 65% barium nitrate, and 10% of a binder comprising 90% of Epon 828 and 10% polyamide.

The forward end of the booster pellet is covered with a series of two cardboard-like wads 42 and 44 separated by a stainless steel disc 46. The outer wad 44 is covered with a stainless steel disc 48 and a thin coating of epoxy resin 50 is applied to complete the closure.

To assemble the temperature sensor, the phosphorus or other pyrophoric material is removed from the water in which it is stored and dried in a nitrogen atmosphere prior to loading. After the phosphorus has dried, it is pressed into both ends of the brass sleeve 16. By using a brass sleeve of given dimensions, the proper charge weight of phosphorus is conveniently and easily provided. While the phosphorus is still in a nitrogen atmosphere, the brass sleeve 16 is loaded into the brass housing 12 and the set-screw 22 and fuse metal seal 26 applied at opposite ends thereof so that the phosphorus is sealed within a nitrogen atmosphere.

The booster pellet 10 is prepared and pressed into the forward end of the aluminum housing 4. The ignitor mix 34 is pressed into the holes 38 in the rearward end of the booster pellet 10. The aluminum sleeve 32 has its forward end coated with a suitable adhesive and the disc 36 applied thereto. After the adhesive is cured the aluminum sleeve 32 is inserted into the aluminum housing 4 until the disc 36 is tight against the end of the booster pellet and the pressed ignitor mix 34 therein. After a suitable quantity of the ignitor mix 34 is positioned within the aluminum sleeve 32, the detector assembly 6 is pressed into the sensor body against the ignitor sleeve. The cavity at the rear of the detector assembly 6 is filled with adhesive. The wads 42 and 44 are assembled in the cavity at the front end of the temperature sensor along with the stainless steel discs 46 and 48. Thereafter the front end of the temperature sensor is coated with the epoxy resin 50.

In operation, when the element in which the sensor 2 is located reaches the temperature at which the sensor 2 is supposed to be activated, the heat is transferred through the housing 4 and brass housing 12 whereupon the fuse metal seal 26 will melt. If the activation temperature is higher than the melting point of the pyrophoric material, (about 90° F. in the case of phosphorus), the pyrophoric material will be in liquid form and will have expanded and flowed into the spaces 28 and 30 provided within the bore 14 within the brass housing 12. As soon as the fuse metal seal 26 is broken, the air present in the aluminum sleeve 32 causes spontaneous ignition of the pyrophoric material 20 which in turn causes ignition of the ignitor mix 34 in the aluminum sleeve 32. As the ignitor mix 34 burns, the disc 36 disintegrates causing ignition of the ignitor mix 34 present in the ends of the booster pellet 10. As the ignitor mix 34 continues to burn, the end and inside of the booster pellet 10 begins to burn with a gradual buildup in pressure inside the pellet 10. When the pressure has risen to a degree wherein combustion of the booster pellet 10 will be sustained, the pressure forces the wads 42 and 44 and stainless steel discs 46 and 48 to break the epoxy seal 50 and blow out of the end of the housing 4 whereupon the flame produced by the burning of the booster pellet 10 emerges therefrom for a suitable distance.

As has been mentioned, one particular application of the above-described temperature sensor 2 is in connection with the journal bearing of a railway car to provide means to activate a signal to prevent what is commonly known as a hot box. As shown in FIGURE 2, the journal bearing structure of the railway car usually comprises a journal box 52, an axle journal 54, a journal bearing 56 provided with a lining 58 of suitable bearing material such as bronze or babbit metal which seats on the journal, and a bearing wedge 60 between the bearing and top 62 of the journal box 52. The journal box 52 is normally closed by a hinged lid 64. Lubrication is applied by means including a lubricant saturated cotton cord or other bibilious material 66 which is located in the bottom part of the journal box 52 so as to press resiliently against the bottom and side of the journal 54.

The temperature sensor 2 is mounted within an axially extending opening 68 in the journal bearing 56 and is inserted with the booster pellet end thereof facing toward the journal box lid 64.

An acceptor 70 may be conveniently mounted on the journal box lid to convert the flame emitted from the temperature sensor 2 into a form to initiate a signal. As shown in FIGURE 2, the signal comprises a fusee 72 charged with a sufficient amount of suitable color and/or smoke-producing, slow burning, pyrotechnic composition.

More specifically, the acceptor 70 comprises a detonator case 74 mounted in a block 76 attached to the inside of the journal box lid 64. The inside end of the detonator case 74 is closed by a coating 78 of lead styphnate in a nitrocellulose lacquer. Within the case 74 and in contact with the coating 78 is a suitable pyrotechnic "gasless" ignition mix 80. By way of example, this ignition mix may comprise the following ingredients by weight of the resulting mixture: boron 20%, barium chromate 60% and potassium perchlorate 20%.

One end of a safety fuse 82 is in intimate contact with the ignition mix 80. The safety fuse 82 is so constructed that the burning is contained within a suitable fuse envelope until the flame reaches the end of the fuse where it emerges as a characteristic "end spit" and readily ignites the ignitor button 84 of the fusee.

A suitable fuse construction which may be used with this invention involves a central flammable core of black powder composition or the like 86 about which there is built up a flexible and protective casing 88 including an inner layer of yarn containing considerable air space and treated so as to render the yarn flame resistant. The outside of the fuse 82 is a water and oil proof coating or cover including one or more of treated paper, lead, foil or other suitable material. The cover may be laminated, coated or impregnated with a suitable flame suppressing material capable of resisting oil and water. In any event, the fuse cord 82 contains a suitable powder train and encloses sufficient space and voids to take up the products of combustion of the fuse train without development of excessive pressure.

The fusee 72 may comprise a paper tube 90 having a compressible plug 92 at one end, which together with the tube 90 is consolidated in a metallic cup 94 which is attached to the journal box lid. A pyrotechnic composition 96 is compacted between the surrounding tube 90 and the safety fuse 82 which extends through the cup 94 and plug 92 to the opposite end of the fusee 72 for igniting the ignitor button 84. The outer end of the tube 90 is crimped to seal the combustible top wad 100.

One suitable pyrotechnic composition for example, includes magnesium, zinc oxide, and ammonium perchlorate ignitable by ignitor buttons composed of black powder, potassium nitrate and silicon mixed with a binder of nitrocellulose, all as set forth in U.S. Patent 2,939,780, issued June 7, 1960.

With this arrangement, when the bearing 56 approaches a temperature beyond the safe operating maximum and the sensor 2 is activated in the manner described above, the flame therefrom will shoot across the gap and will ignite the lead styphnate coating 78 which would in turn ignite the ignition mix 80. The ignition mix 80 will ignite the safety fuse which will in turn transfer the ignition to the ignitor button 84 of the fusee igniting the fusee. The burning of the fusee 72 will result in the production of a bright light and smoke which will alert outside observers to the unsafe condition.

It is to be understood that various other modifications and alterations will readily suggest themselves to persons skilled in the art. It is intended, therefore, that the foregoing description of a preferred embodiment be considered as exemplary only and that the scope of this invention be ascertained from the following claims.

What is claimed is:

1. A temperature sensor comprising a housing, pyrophoric material capable of ignition upon exposure to air sealed in a non-air environment in said housing, energy generating means positioned in an air environment adjacent said pyrophoric material, and a fusible metal seal adapted to melt at a predetermined temperature separating said pyrophoric material and said energy generating means, said energy generating means adapted to be actuated upon the melting of said fusible metal seal and the spontaneous ignition of said pyrophoric material when exposed to air.

2. The temperature sensor of claim 1 wherein said energy generating means is a flame emitting substance.

3. A temperature sensor comprising a housing having a forward and rearward end, detector means including pyrophoric material capable of ignition upon exposure to air sealed in a non-air environment adjacent the rearward end of said housing, ignitor material positioned in said housing next to said pyrophoric material and separated therefrom by a fusible metal seal which melts at a predetermined temperature, and a booster pellet capable of emitting a flame from said housing as it burns positioned next to said ignitor mix and terminating adjacent said forward end.

4. The temperature sensor of claim 3 wherein said detector means comprises a detector body having a bore therethrough, said pyrophoric material being contained within said bore, seal means closing the rearward end of said bore, and said fusible metal seal closing the forward end of said bore.

5. The temperature sensor of claim 4 wherein a sleeve member is mounted within said bore in said detector body and said pyrophoric material is positioned within said sleeve member, said seal bore being volumetrically larger than said pyrophoric material at ambient temperatures.

6. The temperature detector of claim 4 wherein an aluminum sleeve is positioned within said housing in abutment with the end of said detector body that is sealed by said fusible metal seal and said ignitor material is positioned within said sleeve.

7. The temperature sensor of claim 4 wherein said booster pellet comprises a generally hollow, cylindrical member having a plurality of axially extending bores in its end adjacent to said ignitor mix, said bores containing an ignitor mix.

8. The temperature sensor of claim 7 wherein said ignitor mix is positioned within an aluminum sleeve which is in abutment with the end of said detector body, the end of said aluminum sleeve being closed by a thin disc of easily ignitable and consumable material, and the forward end of said housing adjacent said booster pellet is sealed by seal means, said seal means including a fibrous wad frictionally received within said housing and positioned against the forward end of said booster pellet a stainless steel disc positioned against said wad, a second fibrous wad frictionally received within said housing in abutment with said stainless steel disc, a second stainless steel disc in abutment with said second wad, and adhesive means covering said second stainless steel disc and in adhesive contact with said housing.

9. The temperature sensor of claim 4 wherein said pyrophoric material is phosphorus.

10. The temperature sensor of claim 4 wherein said ignitor mix comprises equal proportions by weight of silicon, lead dioxide and cuprous oxide.

11. The temperature sensor of claim 10 wherein said booster pellet comprises from about 20 to about 30% by weight of magnesium, from about 60 to about 70% by weight of barium nitrate, and from about 8 to about 12% by weight of a binder.

12. The temperature sensor of claim 10 wherein said binder comprises from about 88 to about 92% of a lower molecular resin formed from the condensation product of epichlorohydrin and bisphenol-A and from about 8% to about 12% by weight of a polyamide.

13. The temperature sensor of claim 12 wherein said booster pellet comprises 25% magnesium, 65% barium nitrate, and 10% of a binder comprising 90% of said condensation product and 10% polyamide.

14. In a housed journal bearing assembly including a journal bearing and wall means enclosing said journal bearing and spaced therefrom, a temperature sensor mounted in an axially extending bore in said journal bearing, said temperature sensor comprising a tubular housing having a forward end and a rearward end secured within said recess with said forward end facing said wall means, detector means including pyrophoric material capable of ignition upon exposure to air sealed in a non-air environment in said housing adjacent the rearward end thereof, ignitor material positioned in said housing next to said pyrophoric material and separated therefrom by a fusible metal seal which melts at a predetermined temperature, and a booster pellet capable of emitting a flame from said housing when ignited positioned next to said ignitor mix having an end portion adjacent said forward end, acceptor means mounted on said wall means spaced from said temperature sensor in a position to be contacted by the flame from said booster pellet and actuate a signal.

References Cited

UNITED STATES PATENTS

| | | | |
|---|---|---|---|
| 1,308,463 | 7/1919 | Webb | 149—44 |
| 1,708,187 | 4/1929 | Meek | 149—44 |
| 1,877,127 | 9/1932 | Hale | 149—37 |
| 1,903,814 | 4/1933 | Graff | 149—37 |
| 1,920,254 | 8/1933 | Graff | 149—40 |
| 1,975,099 | 10/1934 | Graff | 149—40 |
| 1,975,785 | 10/1934 | Graff | 149—40 |
| 2,131,041 | 9/1938 | Hale | 149—44 |
| 2,478,918 | 8/1949 | Hale | 149—37 |
| 2,556,042 | 6/1951 | Rogers | 116—114 |
| 2,726,943 | 12/1955 | Heiskell | 149—44 |
| 2,726,944 | 12/1955 | Heiskell | 149—44 |
| 2,995,526 | 8/1961 | De Ment | 149—85 |
| 3,062,176 | 11/1962 | Williams | 116—104 |

LOUIS J. CAPOZI, Primary Examiner

U.S. Cl. X.R.

149—37